United States Patent [19]

Kirkpatrick et al.

[11] Patent Number: 4,637,935
[45] Date of Patent: Jan. 20, 1987

[54] PROCESS FOR MAKING A REDUCED DENSITY ROAST AND GROUND COFFEE

[75] Inventors: Steven J. Kirkpatrick; Steven A. Zoller, both of Cincinnati, Ohio; Daniel L. Woods, Winter Haven, Fla.

[73] Assignee: The Procter & Gamble Company, Cincinnati, Ohio

[21] Appl. No.: 793,592

[22] Filed: Oct. 31, 1985

[51] Int. Cl.⁴ .............................................. A23F 5/08
[52] U.S. Cl. ...................................... 426/443; 241/30; 426/595; 426/518
[58] Field of Search .................. 241/30; 426/443, 595, 426/518

[56] References Cited

U.S. PATENT DOCUMENTS 3,801,716  4/1974  Mahlmann et al. ............. 426/473 X
4,349,573  9/1982  Stefanucci et al. ................ 426/595

OTHER PUBLICATIONS

Siuetz et al, Coffee Technology, 1979, Avi: Westport, Conn., pp. 265-276.

*Primary Examiner*—Joseph Golian
*Attorney, Agent, or Firm*—Gary M. Sutter; Rose Ann Dabek; Richard C. Witte

[57] ABSTRACT

The present invention is a process for making a reduced density roast and ground coffee product comprising the steps of: (a) cracking roasted coffee beans to a size such that about 40% to about 80% are retained in a 6-mesh screen (3.36 mm, 0.132 in.); then (b) normalizing the cracked beans; and then (c) grinding the cracked and normalized beans. The roast and ground coffee product produced by the combination of the three steps has a density between about 0.24 g/cc and about 0.41 g/cc.

The reduced density roast and ground coffee product has an acceptable non-chaffy appearance. Problems associated with the use of air removal and screening are avoided.

3 Claims, No Drawings

PROCESS FOR MAKING A REDUCED DENSITY ROAST AND GROUND COFFEE

FIELD OF THE INVENTION

The field of this invention is roast and ground coffee processing.

BACKGROUND OF THE INVENTION

This invention relates to the processing of coffee beans to make roast and ground coffee. More particularly, it relates to a process for making a reduced density roast and ground coffee product having a less chaffy appearance.

In the standard roast and ground coffee process, non-roasted coffee beans are cracked, then ground, and then normalized. Cracking breaks the beans into very large pieces and releases the chaff. During the grinding step the pieces of ground coffee and chaff are broken into smaller pieces. Since the surface area increases, more of the naturally occurring coffee oil is exposed. The normalizer is a mixing chamber with rotating paddles which beat the light-colored chaff into tiny fragments and mix them with the dark-colored coffee oil. Normalization gives the coffee a better appearance because the small, darkened chaff particles are more difficult to see against the background of the ground coffee beans.

Normalization has the additional effect of densifying the coffee because the mixing rounds off the edges of the coffee particles, allowing them to pack closer and more efficiently together. This densifying effect of normalization is a problem if one wishes to produce a lower density coffee product. Air removal or screening can be used instead of normalization to deal with the chaff problem; however, with air removal the small coffee particles are lost with the chaff, and with screening the small pieces of chaff are not removed. These alternatives to normalization are thus imperfect solutions to the chaff problem.

U.S. Pat. No. 4,349,573 to Stefanucci et al., issued Sept. 14, 1982, discloses a process for making a low density coffee. The process comprises: (a) preparing a roasted high quality coffee bean fraction under short roasting conditions effective to produce a roasted high quality coffee bean fraction having a roast color of no more than 50 and a bulk density less than 0.35 g/cc; (b) preparing a roasted intermediate quality coffee bean fraction under short roasting conditions effective to produce a roasted intermediate quality coffee bean fraction having a roast color of 60 and a bulk density less than 0.32 g/cc; (c) preparing a roasted low quality coffee bean fraction under short roasting conditions effective to produce a roasted low quality coffee bean fraction having a roast color of 85 and a bulk density less than 0.40 g/cc; (d) blending the roasted fractions of steps (a), (b) and (c) in a ratio effective to produce a ground blend having a maximum free flow density of 0.30 g/cc and wherein the high quality coffee constitutes 25–40%, the intermediate quality coffee constitutes 50–60% and the low quality coffee constitutes 10–15% of the final blend; (e) grinding the roasted blend of step (d), while bypassing the grinder normalizer, to an average particle size of 880–900 microns for electric percolator grind; of 830–850 microns for stove percolator grind; or of 740–760 microns for automatic drip grind.

In the Stefanucci et al. process the ground beans are not normalized. While this process produces a low density coffee, the low density is achieved by avoiding the normalization step altogether. This results in a chaffy appearance in the ground product. The chaff must then be removed using air or screens (with their inherent problems discussed above), or it can be left in the coffee, creating an unacceptable appearance.

Hence, there is a need for a process of making a reduced density roast and ground coffee in which the chaff problem is addressed by a method other than by eliminating the normalization step.

It is therefore an object of the this invention to provide a process which retains the normalization step but still produces a low density coffee.

It is another object of this invention to produce a reduced density roast and ground coffee having a non-chaffy appearance.

These and other objects of the invention will become clear by the disclosure herein.

SUMMARY OF THE INVENTION

The present invention is a process for making a reduced density roast and ground coffee product comprising the steps of: (a) cracking roasted coffee beans to a size such that about 40% to about 80% are retained on a 6-mesh screen (3.36 mm, 0.132 in.); then (b) normalizing the cracked beans; and then (c) grinding the cracked and normalized beans; the coffee product produced having a density between about 0.24 g/cc and about 0.41 g/cc.

This process makes a reduced density roast and ground coffee that has an acceptable non-chaffy appearance. The problems associated with the use of air removal and screening are avoided.

DETAILED DESCRIPTION OF THE INVENTION

It has now surprisingly been discovered that by changing the normal coffee grinding procedures, the normalization step can be retained to deal with the chaff problem, while at the same time a low density coffee can be produced.

Conventional commercial grinding equipment is built so that cracking rolls are first in the order, followed by grinding rolls and then a normalizer. In the original equipment design of a normalizer, two necessary functions were performed: making the appearance of the coffee more uniform and acceptable, and increasing the density of the coffee to fit into the appropriate container. When the need for a reduced density coffee product arose, the only obvious solution was to reduce or eliminate the normalizing step to lower density.

The unobvious solution, and a key to this invention, was the discovery that the dual goals of reduced density and acceptable appearance can be achieved by reversing the order of the normalization and grinding steps. It was found that grinding coarse, already normalized coffee particles results in a low density product with an acceptable non-chaffy appearance.

In the process of this invention, coffee beans are first cracked into very large pieces having a specific size, thereby releasing the chaff. If the beans are cracked too coarse, the final product will be chaffy, and if the beans are cracked too fine, the final product will be too dense.

The coffee is then normalized to color and break up the chaff. The density of the coffee is increased at this point because the edges of the large coffee particles have been rounded off. However, these large particles are then ground into smaller particles by passing them through grinding rolls. The grinding creates irregular edges again, and the coffee has a low density without a chaffy appearance. A unique contribution of this development is the discovery that grinding coarse, already normalized coffee particles results in a low density product with acceptable appearance.

The term "density" as used herein refers to bulk density, the overall density of a plurality of particles measured after vibratory settlement in a manner such as that described on page 529 of Sivetz et al., "Coffee Technology", Avi Publishing Company, Westport, Conn. (1979).

The process of this invention works with any starting blend of green coffee beans. The three major types of coffee beans are milds, Brazilians, and Robustas. Botanically, the milds and Brazilians are traditionally thought of as Arabicas.

The milds give coffee brews which are fragrant and acidic. Brazilian beans result in coffee brews which are relatively neutral flavored. The Robusta beans produce brews with strong distinctive flavors that possess varying degrees of dirty or rubbery notes. Traditionally, the milds are the most expensive of the three types of beans, with Brazilians being of intermediate expense, and Robustas being least expensive.

Decaffeinated beans can be used in this process as well. Any standard decaffeination process is acceptable.

Any of the variety of roasting techniques known to the art can be used to roast the green coffee in the process of this invention. In the normal operation of preparing conventional roast and ground coffee, coffee beans are roasted in a hot gas medium at a temperature of from about 176.7° C. (350° F.) to about 260° C. (500° F.) with the time of roasting being dependent on the flavor characteristics desired in the coffee beverage when brewed. Where coffee beans are roasted in a batch process, the batch roasting time at the hereinbefore given temperatures is generally from about 2 minutes to about 20 minutes. Where coffee beans are roasted in a continuous process, the residence time of the coffee beans in the roaster is typically from about 30 seconds to about 9 minutes. The roasting procedure can involve static bed roasting as well as fluidized bed roasting.

The coffee beans can be roasted to any desired roast color. Darker roasts develop strong flavors that are very desirable in many European countries. Lighter roasts can be used to produce clear, reddish cup colors with slightly weaker flavors. The Hunter Color "L" scale system is generally used to define the color of the coffee beans and the degree to which they have been roasted. A complete technical description of the system can be found in an article by R. S. Hunter, "Photoelectric Color Difference Meter", *J. of the Optical Soc. of Amer.*, 48, 985-95 (1958). In general, it is noted that Hunter Color "L" scale values are units of light reflectance measurement, and the higher the value is, the lighter the color is since a lighter colored material reflects more light. In particular, in the Hunter Color system the "L" scale contains 100 equal units of division; absolute black is at the bottom of the scale (L=0) and absolute white is at the top (L=100). Thus, in measuring degrees of roast, the lower the "L" scale value the greater the degree of roast, since the greater the degree of roast, the darker is the color of the roasted bean.

Typical roasting equipment and methods for roasting coffee beans are described, for example, in Sivetz & Desrosier, Coffee Technology, Avi Publishing Company, Westport, Conn., 1979, pp. 226-246. U.S. Pat. No. 3,964,175 to Sivetz, issued June 22, 1976, discloses a method for fluidized bed roasting of coffee beans.

In the process of this invention, the roasted coffee beans are first cracked to a size such that about 40% to about 80% are retained on a 6-mesh U.S. Standard Screen. Preferably, they will be cracked to a size of about 50% to about 80% on a 6-mesh U.S. Standard Screen, and most preferably to a size of about 60% to about 80% on the 6-mesh screen. [U.S. Standard Screens can be related to particle size. See Perry et al., "Perry's Chemical Engineers' Handbook", 6th Ed., p. 21-15, McGraw-Hill Book Co., New York, NY (1984)]. A 6-mesh screen has an opening of 3.36 mm. or 0.132 inches. This means that from about 40% to about 80% of the particles are larger than about 3.36 mm, and about 20% to about 60% are smaller.

The cracking operation cracks the beans to as coarse a size as possible with substantially all of the beans cracked, and with substantially all of the beans having their chaff loosened. It has been found that these conditions are met when about 40% to about 80% of the cracked beans are retained on a 6-mesh screen.

If more than about 80% of the cracked beans remain on a 6-mesh screen, the cracked beans are too coarse and not all of the chaff is loosened, and the final product has an appearance that is too chaffy. If less than about 40% of the cracked beans remain on the 6-mesh screen, the beans are cracked too finely, and the final product is too dense.

Any comminution equipment can be used for the cracking operation of this process. For example, a Gump grinder, manufactured by B. F. Gump Company, Chicago, Ill., contains both cracking and grinding rolls, and it is suitable for the practice of this invention. Also suitable is a Fitzmill hammer mill, manufactured by Fitzpatrick Manufacturing Co., Elmhurst, Ill. The present process is not equipment specific. Any grinder with cracking rolls or any other type of comminution equipment or methods can be used as long as they are capable of cracking the beans to the desired size.

Some different equipment and methods for cracking, normalizing, and grinding coffee are found in Sivetz et al., Coffee Technology, Avi Publishing Company, Inc., Westport, Conn., pp. 265-276 (1979). Commercially sold equipment (for example, Gump) which combines apparatus for cracking, grinding, and then normalizing has the three operations in that order. Therefore, this commercial equipment will have to be changed to put the normalizing step before the grinding step.

It does not matter how many cracking rolls or grinding rolls are used in the cracking and grinding steps, or whether other comminution equipment is used for the cracking and grinding, as long as the coffee is cracked to the correct particle size range and ground to the desired size.

After cracking, the beans are normalized. In the normalization process the cracked coffee particles are heavily mixed together. This causes the chaff to break into smaller pieces and coffee oil to be released from the coffee particles. The smaller chaff particles mixed with the coffee oil are then less conspicuous against the background of the coffee particles. The oil is also absorbed into the chaff and is not lost. There it can provide aroma to the ground coffee and additional flavors during processing. In the process of this invention, the ideal normalization procedure is to normalize the cracked coffee particles just enough to adequately change the appearance of the chaff, and then stop normalizing. Too much normalization will densify the coffee particles to an unacceptable extent. It is better to err on the side of leaving a small amount of chaff visible. This is especially true if the coffee particles will be mixed after the normalization operation, for example, in a screw conveyor. This mixing is in effect added normalization, so the normalization step may need to be shortened to compensate for this added handling. In general, the normalization may take between about 15 seconds and about 1 minute, depending on the type of equipment used and the feed rate.

The coffee particles are sufficiently normalized or mixed when the light-colored large pieces of chaff are turned into dark-colored (because of the coffee oil) small pieces of chaff that are difficult to see against the background of the coffee.

The type of normalization equipment used is not critical. The normalizer is essentially just a mixer. Examples of suitable equipment are a Gump normalizer or a ribbon blender. The equipment can be modified (especially in length) for optimum industrial use.

In the last step of the present process, the cracked and normalized beans are ground to the desired size. The process will work with any type of grind. The standard grinds (from coarsest to finest) are electric perk, regular, automatic drip coffee, drip, and fine. For example, automatic drip coffee has a particle size distribution of about 7% above a 14-mesh screen, about 18% above a 16-mesh screen, and about 50% above a 20mesh screen, while regular coffee has a particle size distribution of about 32% above a 14-mesh screen, about 42% above a 16-mesh screen, and about 70% above a 20-mesh screen. Grinding of the coffee can be done in any of the ways known to those skilled in the art.

The roast and ground coffee product produced by the combination of the cracking, normalizing and grinding steps of this invention must have a density between about 0.24 g/cc and about 0.41 g/cc. This density range is determined primarily by the need for a reduced density coffe, by the physical fit of the coffee product into the coffee container, and by the amount of coffee used to brew the coffee drink.

The final product density is controlled mostly by the cracking and normalizing steps as explained above, and by the degree of roast, with a darker roast generally producing a less dense coffee bean. The grinding step has little effect on the product density.

The following examples are intended only to further illustrate the invention and are not intended to limit the scope of the invention which is defined by the claims.

EXAMPLE 1

A blend of Arabica and Robusta coffee beans is roasted in a continuous roaster for 2.5 minutes at about 500° F. (260° C.) to a Hunter L-color of about 20. The roasted beans are then cracked with Gump cracking rolls to the following particle size distribution: 65% on a 6-mesh screen, 22% on an 8-mesh screen, 10% on a 16-mesh screen, and 3% in the pan. Next the cracked beans are normalized in a Gump normalizer for about 15 to 30 seconds, just long enough to change the appearance of the chaff. Finally, the cracked and normalized beans are ground in Gump grinding rolls to a typical ADC (Automatic Drip Coffee) grind. The density of the roast and ground coffee is now about 0.35 g/cc, contrasted with about 0.45 g/cc for conventionally ground and normalized coffee. The coffee has an excellent non-chaffy appearance.

EXAMPLE 2

A batch of Arabica coffee beans is roasted in a Thermalo batch roaster (Blaw-Knox Food & Chemical Equipment, Inc., Buffalo, NY) for 3.2 minutes at about 450° F. (232° C.) to a Hunter L-color of about 24. The beans are then cracked with Gump cracking rolls to a particle size distribution of 70% on a 6-mesh screen, 20% on an 8-mesh screen, 8% on a 16-mesh screen, 1% on a 20-mesh screen, and 1% in the pan. Next they are normalized in a ribbon blender until the chaff is broken up and mixed with the coffee oil. The cracked and normalized coffee particles are then ground to the standard electric perk grind. The density of the particles is 0.34 g/cc. The coffee's appearance is non-chaffy.

EXAMPLE 3

A blend of Arabica and Robusta beans is roasted in a Probat Batch Turbo roaster Probat Corp., Emmerich, Germany for 2 minutes at about 600° F. (315° C.) to a Hunter L-color of about 16. The roasted beans are then cracked in Gump cracking rolls to a particle size distribution of 60% on a 6-mesh screen, 25% on an 8-mesh screen, 10% on a 16-mesh screen, and 5% in the pan. Next, the cracked beans are normalized in a Gump normalizer until the chaff is broken up and darkened, and hard to see against the background of the coffee. Finally, the beans are ground to the typical Italian fine grind. The density of the coffee product is 0.25 g/cc. It has an excellent non-chaffy appearance.

What is claimed is:

1. A process for making a reduced density roast and ground coffee product comprising the steps of:
   (a) cracking roasted coffee beans to a size such that about 40% to about 80% are retained on a 6-mesh screen; then
   (b) normalizing the cracked beans; and then
   (c) grinding the cracked and normalized beans;
   the coffee product produced having a density between about 0.24 g/cc and about 0.41 g/cc.

2. A process according to claim 1 wherein the coffee beans are cracked to a size such that about 50% to about 80% are retained on a 6-mesh screen.

3. A process according to claim 2 wherein the beans are cracked to a size such that about 60% to about 80% are retained on a 6-mesh screen.

* * * * *